UNITED STATES PATENT OFFICE.

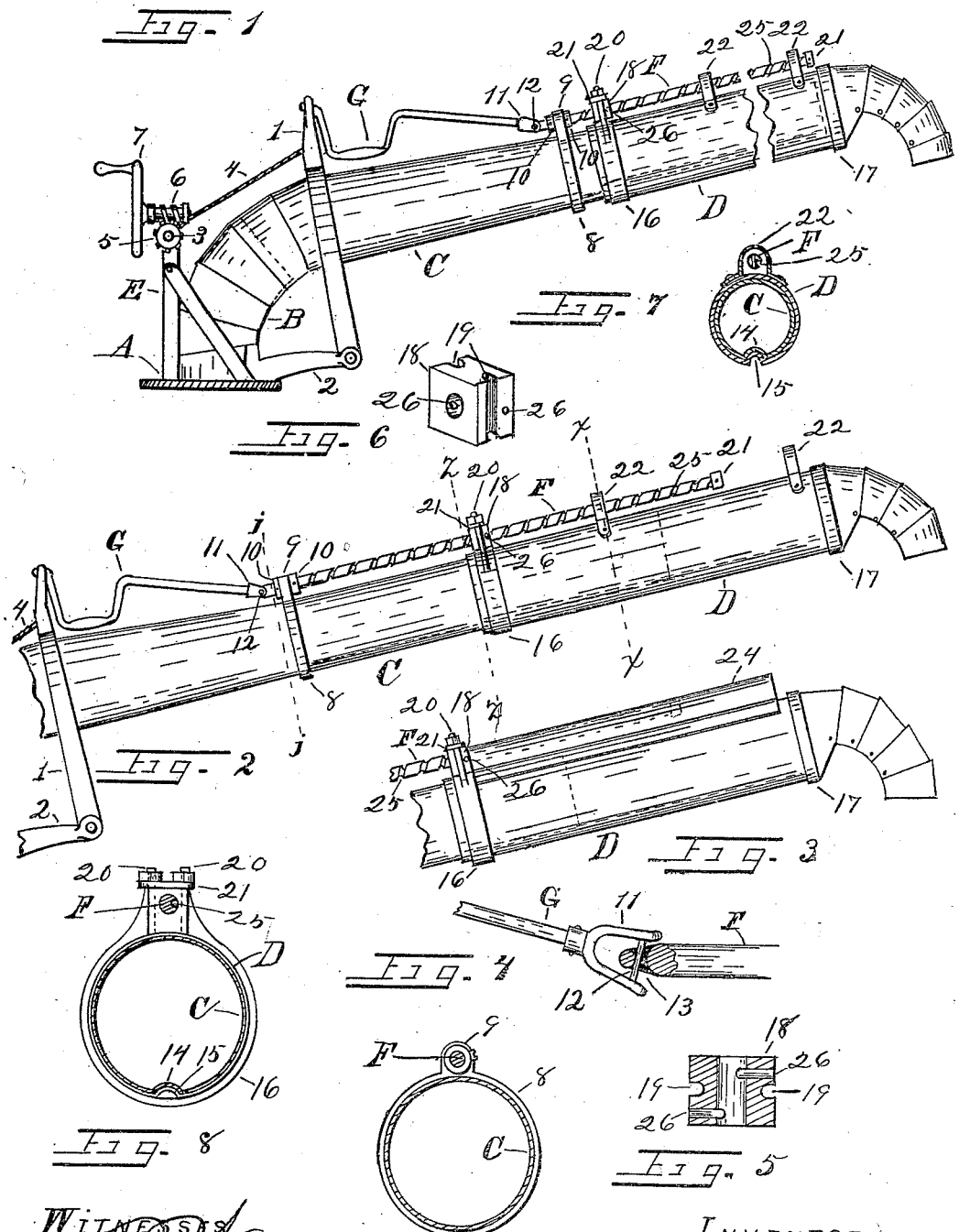

PETER T. KIRKPATRICK, OF BATTLE CREEK, MICHIGAN, ASSIGNOR OF ONE-HALF TO JOSEPH F. RUSSELL, OF BATTLE CREEK, MICHIGAN.

PNEUMATIC STRAW-STACKER.

958,137.            Specification of Letters Patent.        Patented May 17, 1910.

Application filed April 19, 1909. Serial No. 490,886.

*To all whom it may concern:*

Be it known that I, PETER T. KIRKPATRICK, a subject of Great Britain, residing at Battle Creek, in the county of Calhoun and State of Michigan, have invented certain new and useful Improvements in Pneumatic Straw-Stackers, of which the following is a specification.

This invention relates to pneumatic straw stackers, and more particularly has reference to mechanism for telescoping the straw-conducting pipes thereof.

Among other objects, I provide a mechanism for the purpose that will be positive in operation, easy to manipulate and comparatively cheap to manufacture.

Other objects and advantages will hereinafter appear from the following specification and will be particularly set forth in the claims.

In the drawings forming a part of this specification, Figure 1 is a side elevation in broken section, with the straw-conducting pipes telescoped. Fig. 2 is a side elevation with the pipes extended. Fig. 3 is a modification of the means for guiding the adjusting screw or shaft. Fig. 4 is a detail, partially in section, of the joint between the adjusting screw and its crank rod. Fig. 5 is a cross section of the adjusting nut. Fig. 6 is a perspective view of the adjusting nut. Fig. 7 is a cross section on the line x—x of Fig. 2. Fig. 8 is an enlarged cross sectional view of Fig. 2 on the line z—z. Fig. 9 is an enlarged cross sectional view of Fig. 2, on the line i—i.

Like marks of reference refer to corresponding parts throughout the different views, in which—

A, represents a turntable of ordinary construction upon which the pneumatic straw-conducting tubes, B, C and D, are mounted, and 1, is a yoke or bracket pivoted to the forward arms, 2, of the turntable which supports the primary tube, C, in the ordinary manner. E, is a bracket secured to the turntable, and it carries a cross shaft, 3, at the upper end thereof about which a cable, 4, is wound, and which in turn is secured to the upper extremity of the yoke, 1. The cross shaft is fitted with a worm gear, 5, which is turned by a worm, 6, operative by a hand wheel, 7. In the construction, arrangement and operation of these parts the same need not necessarily differ from similar apparatus in general use.

I will now proceed to describe my improved mechanism and its mode of application and operation in connection with the pneumatic straw-conducting pipes aforesaid. At a point forward of the yoke, 1, on the tube, C, an encircling band or bracket, 8, is rigidly fitted. This bracket on the upper side of the tube has an eyelet, 9, through which the forward end of a spirally-threaded adjusting shaft, F, is fitted, collars, 10—10, on the shaft either side of said eyelet preventing said shaft from longitudinal displacement. Journaled within the upper end of the yoke, 1, a crank shaft, G, is fitted. The opposite end of this shaft has a yoke or fork, 11, fitted with a pin, 12, which passes through an eyelet, 13, of the spirally-threaded shaft, F, and forms a tumbling rod joint. Over the straight outer extended portion of the tube, C, the telescopic outer tube, D, is fitted, and to prevent the outer tube from rolling on the tube C, the inner tube is provided with a longitudinal bead, 14, within which a corresponding bead, 15, of the tube D, is adapted to slide. I have shown the tubes having the beads provided on their inner surfaces, it being more convenient to fit the encircling brackets 8, 16 and 17 to the tubes as described. To the lower end of the tube D, the bracket 16 is rigidly fitted. This bracket on the upper side of the tube carries a nut, 18, through which the adjusting shaft, F, is fitted and adapted to operate. The nut is portable, by preference, and may be secured to the bracket in any customary or economic manner; one way, which I have shown, is to provide vertical grooves, 19—19, on either outer edge thereof, which in turn are adapted to be received between the upright terminals, 20—20, of the bracket 16, thence fit a cap piece, 21, over said terminals and secure the whole in position by running nuts on the threaded ends of said terminals, as shown. The free end of the shaft, F, may be fitted with a cap or stop, 21, and to prevent displacement or lateral movement of said shaft the tube D is fitted with a series of eyelets or loops, 22—22, through which said shaft may pass. In the modified form shown in Fig. 3, in lieu of the eyelets aforesaid I employ a hood or covering, 24, which is riveted to the tube D.

In the construction of the spiral or threaded shaft, F, the same may be made in any ordinary, convenient or expedient manner adequate to the purpose, the prime object being to provide a threaded or helically-formed shaft and correspondingly-fitted nut, the former by rotation being capable of longitudinally adjusting said nut in relation to said shaft. In the drawings I have shown the shaft, F, with a spiral groove, 25, the nut, 18, being provided with pins, 26—26, arranged diagonally opposite, the pins fulfilling the purpose of a thread and fitting within said groove.

The operation of my invention is as follows: It being desired to extend the tube D in relation to the tube C, the operator will grasp the crank portion of the shaft, G, and rotate the same in the direction desired to cause the screw, or spirally-formed shaft, F, to push the nut, 18, outward. As this nut is immovably secured to the bracket, 16, on the tube D, the outward thrust of said nut will cause said bracket and tube to likewise move outward, the longitudinal grooves, 14 and 15, guiding said tube and preventing any rotary movement thereof, a reversal of the operation causing the tube D to be redrawn or pulled downward over the tube C.

Having, therefore, set forth my invention, what I claim as new and desire to secure by Letters Patent, is:

1. In a device of the class described, the combination with the telescoping straw-conducting tubes and means to prevent the outer tube from rolling on the inner tube, of a spirally-threaded adjusting shaft rotatably secured at one end near the lower end of said inner tube, a nut secured at the lower end of said outer tube and threaded on said spirally-threaded adjusting shaft by which means said outer tube may be longitudinally adjusted on said inner tube by the rotation of said shaft, and means carried by said outer tube to prevent the free end of said adjusting shaft from lateral displacement, substantially as set forth and described.

2. In a device of the class described, the combination with the telescoping straw-conducting tubes and means to prevent the outer tube from rolling on the inner tube, of a spirally-threaded adjusting shaft rotatably secured at one end near the lower end of said inner tube, a nut secured at the lower end of said outer tube and threaded on said spirally-threaded adjusting shaft, by which means said outer tube may be longitudinally adjusted on said inner tube by the rotation of said shaft, and eyelets forming guards fixed to said outer tube to prevent said adjusting shaft from lateral displacement, for the purpose set forth.

3. In a device of the class described, the combination with the telescoping straw-conducting tubes and means to prevent the outer tube from rolling on the inner tube, of a bracket near the lower end of the inner tube, a crank shaft journaled in said bracket, a secondary bracket spaced therefrom and rigidly secured to said tube, a spirally-threaded adjusting shaft journaled at one end in said secondary bracket and means to prevent said shaft from longitudinal displacement therewith, a flexible union connecting said crank shaft to said spirally-threaded adjusting shaft, a nut rigidly secured to the lower end of said outer tube and threaded on said spirally-threaded adjusting shaft and means to keep said adjusting shaft from lateral displacement, all arranged to coact, for the purpose set forth and described.

4. In a device of the class described, the combination with the straw-conducting tubes and means to prevent the outer tube from rotary displacement with the inner tube, of the crank shaft, G, journaled in the yoke, 1, the bracket, 8, secured intermediary of the tube, C, the bracket 16 secured at the lower end of the outer tube D, the nut, 18, carried by said bracket, the spirally-threaded adjusting shaft, F, fitted to actuate said nut and journaled within the bracket, 8, the collars, 10—10, to prevent said shaft from longitudinal displacement, the tumbling rod connecting said crank shaft and said adjusting shaft, and the eyelets, 22—22, to prevent said adjusting shaft from lateral displacement, all arranged to coact, substantially as set forth and described.

PETER T. KIRKPATRICK.

Witnesses:
R. F. WINGATE,
F. H. WINGATE.